(12) United States Patent
Liang et al.

(10) Patent No.: US 10,691,390 B2
(45) Date of Patent: Jun. 23, 2020

(54) METHOD AND DEVICE FOR VIDEO RENDERING

(71) Applicant: Guangzhou UCWEB Computer Technology Co., Ltd., Guangdong (CN)

(72) Inventors: Jie Liang, Guangdong (CN); Chuang Zhao, Guangdong (CN)

(73) Assignee: Guangzhou UCWEB Computer Technology Co., Ltd., Guangzhou (CN)

( * ) Notice: Subject to any disclaimer, the term of this patent is extended or adjusted under 35 U.S.C. 154(b) by 664 days.

(21) Appl. No.: 14/975,018

(22) Filed: Dec. 18, 2015

(65) Prior Publication Data

US 2016/0179296 A1     Jun. 23, 2016

(30) Foreign Application Priority Data

Dec. 18, 2014   (CN) .......................... 2014 1 0799678

(51) Int. Cl.
| | |
|---|---|
| *G06F 3/14* | (2006.01) |
| *H04N 21/472* | (2011.01) |
| *H04N 21/44* | (2011.01) |
| *H04N 21/4782* | (2011.01) |
| *H04N 21/443* | (2011.01) |

(52) U.S. Cl.
CPC .............. *G06F 3/14* (2013.01); *H04N 21/44* (2013.01); *H04N 21/47202* (2013.01); *H04N 21/4435* (2013.01); *H04N 21/4782* (2013.01); *H04N 21/47217* (2013.01)

(58) Field of Classification Search
CPC ...................................... G06F 3/14; G06F 9/44
See application file for complete search history.

(56) References Cited

U.S. PATENT DOCUMENTS

| | | | |
|---|---|---|---|
| 2009/0313670 A1* | 12/2009 | Takao | ................ H04N 5/44591 725/110 |
| 2012/0124227 A1* | 5/2012 | Al-Khowaiter | ..... H04L 65/1046 709/228 |
| 2012/0268474 A1* | 10/2012 | Hachiya | ................ H04N 5/202 345/581 |
| 2014/0067770 A1* | 3/2014 | Cheong | ............... G06F 11/1048 707/687 |
| 2014/0101573 A1* | 4/2014 | Kuo | ........................ G06F 3/048 715/760 |
| 2016/0064039 A1* | 3/2016 | Wu | ..................... G06K 9/00744 386/241 |
| 2016/0179296 A1* | 6/2016 | Liang | ........................ G06F 9/44 715/719 |
| 2016/0291860 A1* | 10/2016 | Higuchi | ........... H04N 21/47217 |

* cited by examiner

*Primary Examiner* — David E Choi

(74) *Attorney, Agent, or Firm* — Alston & Bird LLP

(57) ABSTRACT

The invention discloses a video rendering method and a video rendering device, said method comprising registering a trigger operation of a video node after parsing it on a webpage, creating a video component corresponding to said target video node and using said video component to render said target video node only upon detection of said trigger operation oriented towards said target video node. The video rendering method disclosed by this invention can create the corresponding video component according to a user's playing demands and prevent the system resource waste arising from the system's automatic allocation of a video component to the video node on the webpage and the lack of system memory and poor user experience incurred thereby.

16 Claims, 5 Drawing Sheets

METHOD AND DEVICE FOR VIDEO RENDERING

CROSS-REFERENCE TO RELATED APPLICATION

This application claims priority to and the benefit of Chinese Patent Application Serial No. 201410799678.0 filed with the State Intellectual Property Office of P.R. China on Dec. 18, 2014, the content of which is incorporated herein by reference in its entirety.

TECHNICAL FIELD

This invention relates to the technical field of Internet technology, and in particular, to method and device for video rendering.

BACKGROUND

With the rapid development of mobile Internet, demands for viewing videos on mobile terminal keep increasing. Using Android operating system illustrates a rendering process. When browser loads or updates a webpage that contains a video, it sequentially renders the video and other contents first and then integrates them together for display on screen. It is easier to render a video-free webpage because it needs to render the data by browser to a window and output it to the screen for display. For video webpage, however, it needs to use a video component to render the content to a pre-allocated rendering interface. To play the video, the rendered video will be retrieved from the rendering interface to the screen.

In current technologies, the system kernel will send a loading message to the system shell upon parsing or inserting, via JavaScript, a video node into a webpage when video is being rendered on the webpage. The system shell then creates a video component for each video node according to the loading message, e.g. SurfaceView, SurfaceTexture, etc. When user clicks to play a video that has an associated video node, the video component associated with this video node will render the video to a rendering interface and transmit them to the screen for play. When user clicks to play another video that has an associated video node, the rendering process of the current video will be suspended and the rendering process of the new video node will start. Upon refreshing or closing of a video webpage, the kernel will release all video nodes on that video webpage and send a stop message to the system shell to notify the shell to release the video component associates with the video nodes.

During implementation of rendering, in current technology, the system creates a set of corresponding video components for each video node regardless of whether or not the user clicks such a video node on the webpage. When a webpage contains many videos, a plurality of video components will be occupied. Since different video components need to use different loading interfaces and locking, waiting, inter-process communication and other operations are executed for rendering different loading interfaces, the webpage loading process becomes complicated and time-consuming which may cause the webpage to break down. Moreover, creating multiple video components consumes considerable system resources and increases the probability of lack of memory, thereby worsening user experience.

BRIEF SUMMARY

The present invention provides a method and apparatus for video rendering, to solve the prior art frequency rendering method due to simultaneous use of multiple video components, resulting in page break down, system resource consumption, and lack of system memory that cause worsening users experience.

In order to solve the above problems, the present invention discloses a technical scheme as follows:

According to one exemplary embodiment of the present invention there is provided a video rendering method comprising registering a trigger operation of a video node after parsing it on a webpage, said trigger operation is the user operation to trigger said video node and play the video; detecting said trigger operation oriented towards said target video node; and creating a video component corresponding to said target video node and using said corresponding video component to render said target video node upon detection of said trigger operation.

The method may further comprise judging if a video component corresponding to another video node has been created for such another video node on the webpage upon detection of said trigger operation and releasing said video component corresponding to such another video node if yes.

The method may further comprise setting the corresponding status flag for said video node and initializing said status; flag as false upon parsing of said video node on the webpage; and updating the status flag of said target video node as true after the video component corresponding to said target video node is created.

Alternatively, the method may be characterized by wherein said judging if a video component corresponding to another video node has been created for such another video node on the webpage comprises judging if a video component corresponding to another video node has been created for such another video node on the webpage according to said status flag corresponding to another video node; and updating the status flag of said another video node as true after it is judged that the video component corresponding to said another video node has been created.

The method may further comprise releasing said created video component corresponding to said video node on the webpage upon refreshing or closing of said webpage.

According to one exemplary embodiment of the present invention there is provided a video rendering device comprising: a registering unit, configured to register a trigger operation of a video node after parsing it on a webpage, said trigger operation is the user operation to trigger said video node and play the video; a detecting unit, configured to detect said trigger operation oriented towards said target video node; and a creating unit, configured to create a video component corresponding to said target video node and use said corresponding video component to render said target video node.

The device may further comprise a judging unit, configured to judge if a video component corresponding to another video node has been created for such another video node on the webpage if said detecting unit detects said trigger operation; and a releasing unit, configured to release said video component corresponding to such another video node if said judging unit judges that the video component corresponding to said another video node has been created for said another video mode.

The device may further comprise an initializing unit, configured to set the corresponding status flag for said video node upon parsing of said video node on the webpage and initializing said status flag as false; and an updating unit, configured to update the status flag of said target video node as true after the video component corresponding to said target video node is created.

The device may be characterized by said judging unit is specifically configured to judge if a video component corresponding to said another video node has been created for said another video node according to the status flag corresponding to said another video node. Said updating unit updates the status flag of said another video node as false if it judges that the video component corresponding to said another video node has been created.

The device may further be characterized by said releasing unit is further configured to release said created video component corresponding to said video node on the webpage upon refreshing or closing of said webpage.

BRIEF DESCRIPTION OF THE DRAWING(S)

The present invention is described in detail through the accompanying drawings and implementation manners.

DETAILED DESCRIPTION

Figure 1:
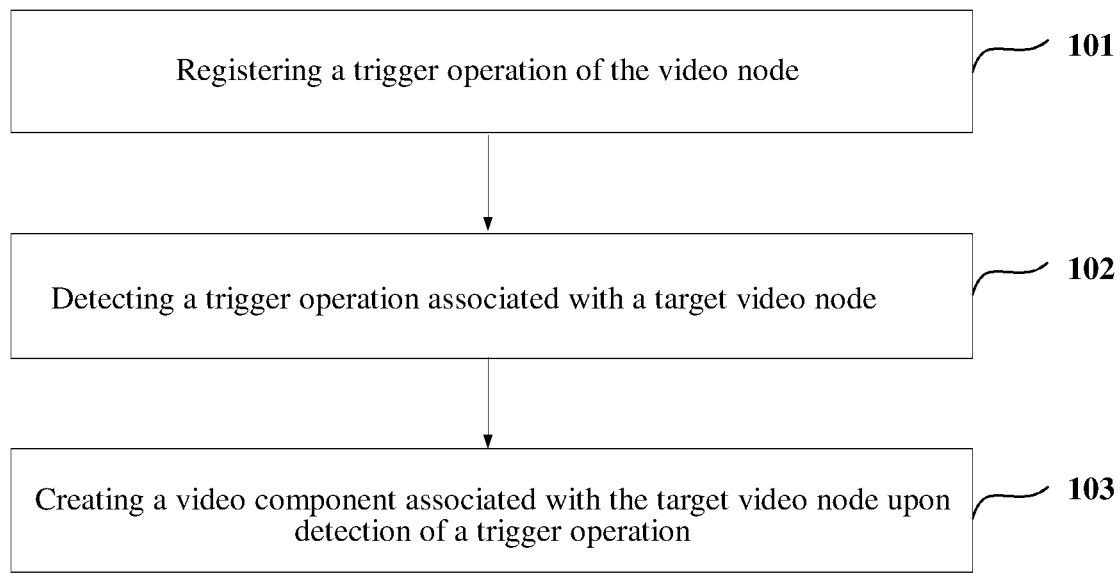
FIG. 1 illustrates a flow chart of a method of a video rendering process in accordance with one embodiment.

FIG. 1 illustrates a flow chart of a method of a video rendering process in accordance with one embodiment. The method comprises following steps.

Step 101: when a video node on a webpage is parsed, a trigger operation of the video node is registered. The trigger operation is performed by a user to trigger a video node to play a video associated with this video node.

In prior technologies, when a video node on a webpage is parsed or inserted, by JavaScript, into the webpage, system kernel will automatically call ScheduleLoad function to send a loading message to the system shell and notify the shell system to create a set of video components associated with the video node. In this embodiment, a trigger operation is pre-registered for each video node. Therefore, instead of automatically calling ScheduleLoad function, ScheduleLoad function is called upon detection of a pre-registered trigger operation. In other words, instead of directly creating a set of video components for each video node by the shell system, a set of video components are created for each video node only upon detection of a trigger operation associated with the video node.

Specifically, the trigger operation is performed by a user to click a video component associated with a video node, or select an item from a preset menu to trigger a video node, or by using any other form of trigger operation designed to trigger a target video node.

Step 102: detecting a trigger operation associated with a target video node.

Step 103: upon detection of a trigger operation, a video component associated with the target video node is created. The video component is used to render the target video node.

The video component refers to a series of View components used for video rendering. The View component may be SurfaceView, VideoView and other video rendering tools.

In this embodiment, when video nodes on the webpage are parsed, trigger operations are pre-registered for each video node. Upon detection of a trigger operation associated with a target video node, video component associated with the target video node is created. And then the video component is used to render the target video node. The video rendering process in this embodiment creates a video component based upon user demand, thus preventing system resource waste arising from system's automatic creation of a video component for each video node on the webpage, solving problem of lack of system memory, and improving user experience.

Figure 2:
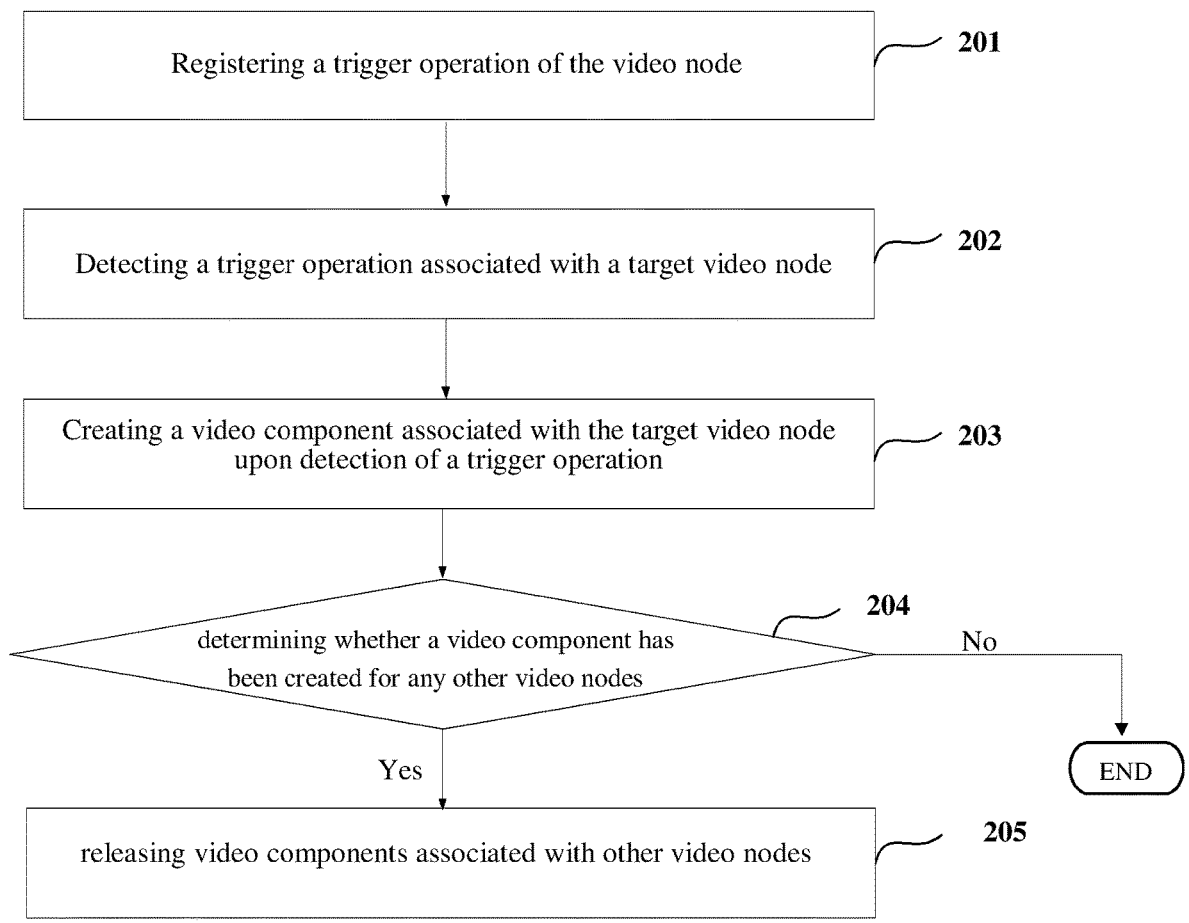
FIG. 2 illustrates a flow chart of a method of a video rendering process in accordance with one embodiment.

FIG. 2 illustrates a flow chart of a method of a video rendering process in accordance with one embodiment. The method comprises following steps.

Step 201: when a video node on a webpage is parsed, a trigger operation of the video node is registered. The trigger operation is performed by a user to trigger the video node to play a video associated with this video node. Specifically, the webpage may be displayed in a browser or in another application.

Step 202: detecting a trigger operation associated with a target video node.

Step 203: upon detection of a trigger operation, a video component associated with the target video node is created. The video component is used to render the target video node.

Step 204: upon detection of a trigger operation, determining whether a video component has been created for any other video nodes. If yes, the method proceeds to step S205. Otherwise the process terminates.

Specifically, whether a video component has been created for a video node can be determined by checking status flag of that video node. If a video component has been created for a video node, status flag of the video node will be set. For instance, true or false respectively indicates that a video component has been created or not been created for the video node.

Step 205: releasing video components associated with other video nodes. The status flag of one video node is reset to false.

In operation, execution sequence of Step 203 and Step 204 is not limited.

In this video rendering process, when a video node on a webpage is parsed, a trigger operation of the video node is registered. Upon detection of a trigger operation associated with a target video node associated with a target video node, a video component associated with the target video node is created. The video component is used to render the target video node. Whether a video node has been created with a video component is determined. If yes, releasing video components associated with other video nodes. The video rendering process in this embodiment creates a video component based upon user demand, enabling one video component on one webpage, thus preventing webpage from breaking down caused by using multiple video components, system resource waste, solving problem of lack of system memory, and improving user experience.

Figure 3:
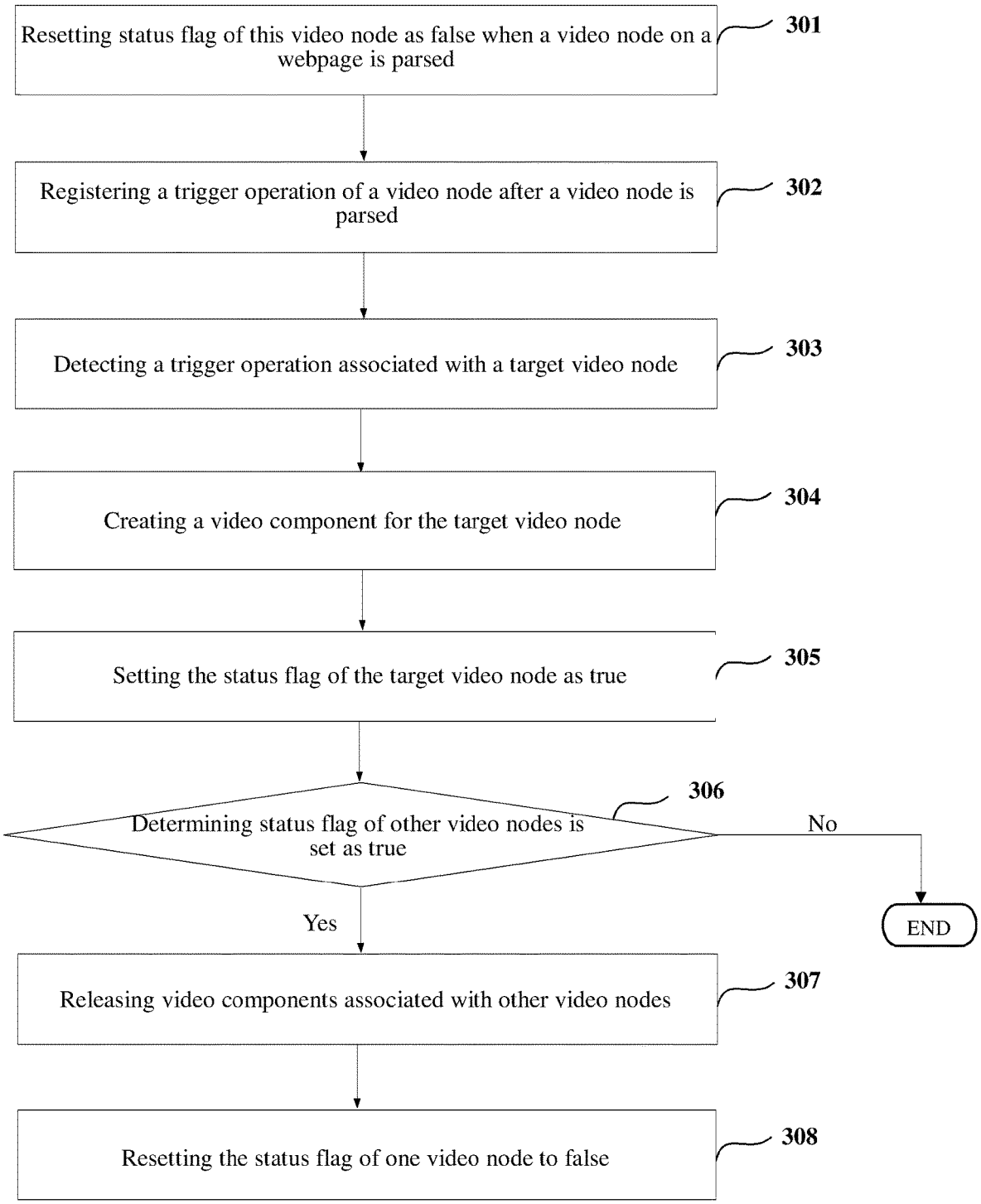
FIG. 3 illustrates a flow chart of a method of a video rendering process in accordance with one embodiment.

FIG. 3 illustrates a flow chart of a method of a video rendering process in accordance with one embodiment. The method comprises following steps.

Step 301: when a video node on a webpage is parsed, status flag of this video node is reset as false.

Specifically, after an object document on the webpage is initialized, a video management file may be created to manage all video node information contained on the webpage. The video management file contains all video nodes on the current webpage and status flag of each video node. The status flag indicates whether its associated video node has been assigned with a video component for rendering. When a new webpage is opened, video nodes contained on this new webpage are added to the video management file after such video nodes are parsed.

The status flag of each video node is initialized as false. It indicates that no video component has been created for any video node. Instead of using true or false, 1 or 0 can also be used to mark the status flag.

Step 302: when a video node on a webpage is parsed, a trigger operation is registered. The trigger operation is performed by a user to trigger the video node to play a video associated with this video node.

Step 303: detecting a trigger operation associated with a target video node. Upon detection of the trigger operation, Steps 304 to 306 are executed.

Specifically, the trigger operation is performed by a user to click a video component associated with a video node, or select an item from a preset menu to trigger a video node, or by using any other form of trigger operation designed to trigger a target video.

"Click" is used as a trigger operation to explain the registration process of Step 302 and the detecting process of Step 303. First, connection between "click play" button associated with video resource on a webpage and a video node associated with the "click play" button is established. After a click operation is received, function of "click play" is edited to call ScheduledLoad function to send a loading message to the system shell, create video components and initialize associated video components. When user clicks on "click play" on the webpage, the system kernel may determine whether it is a click operation. If yes, the system kernel may transmit such click operation to the corresponding video node and proceed to Step 304 to create video nodes and initialize associated video components.

In operation, execution sequence of Step 301 and Step 302 is not limited.

Step 304: a video component is created for the target video node. The video component is used to render the target video node.

Step 305: the status flag of the target video node is set as true.

The status flag associated with the target video node in the video management file is set as true.

In operation, execution sequence of Step 304 and Step 305 is not limited.

Step 306: determining whether status flag of other video nodes is set as true. If yes, then proceed to Steps 307 and 308. Otherwise the process terminates.

If status flag of the video node is set as true a, a video component has been created for a video node.

Step 307: releasing video components associated with other video nodes.

Step 308: the status flag of one video node is reset to false.

In operation, execution sequence of Step 307 and Step 308 is not limited.

When a webpage is refreshed or closed, status flag associated with a video node is checked. When the status flag of one video code is true, video component associated with that video node is released. Video node and its status flag are deleted from the video management file.

In this video rendering process, when a video node on a webpage is parsed, a trigger operation of the video node is registered. Upon detection of a trigger operation associated with a target video node associated with a target video node, a video component associated with the target video node is created. The video component is used to video render the target video node. Whether a video node has been assigned with a video component is determined. If yes, releasing video components associated with other video nodes. The video rendering process in this embodiment creates a video component based upon user demand, enabling one video component on one webpage, thus preventing webpage from breaking down caused by using multiple video components, system resource waste, solving problem of lack of system memory, and improving user experience.

Figure 4:
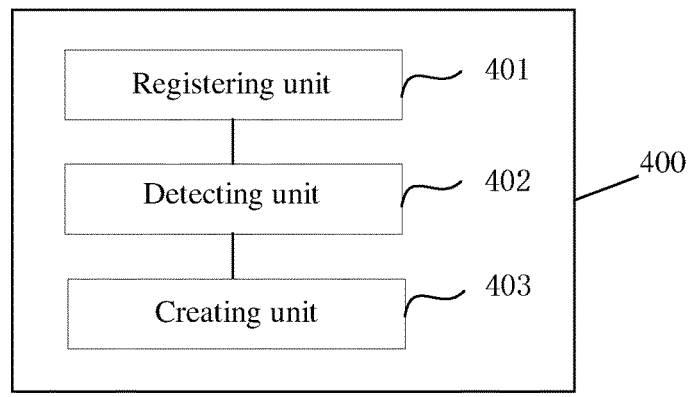
FIG. 4 illustrates a structural diagram of a video rendering device in accordance with one embodiment.

FIG. 4 illustrates a structural diagram of a video rendering device 400 in accordance with one embodiment.

The video rendering device 400 of this embodiment comprises a registering unit 401, a detecting unit 402 and a creating unit 403.

For convenient description, the device is described by units according to functions. Features of various units can be implemented software and/or hardware.

The registering unit 401 is configured to register a trigger operation of a video node after it is parsed on a webpage. The trigger operation is a user operation to trigger the video node and play the video.

The detecting unit 402 is configured to detect the trigger operation associated with a target video node.

The creating unit 403 is configured to create a video component associated with the target video node and use the created video component to render the target video node upon detection of the trigger operation.

Figure 5:
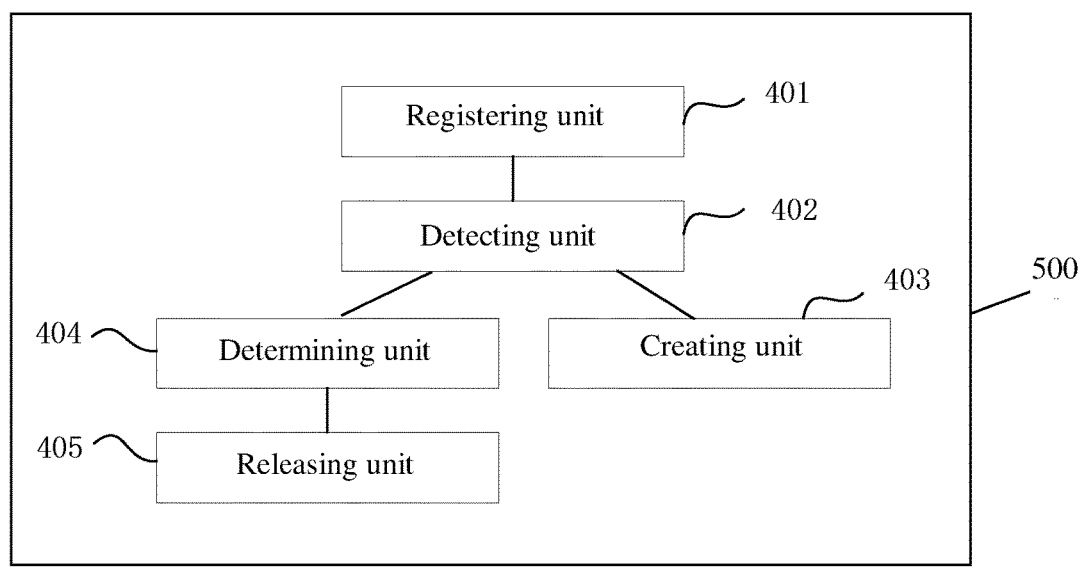
FIG. 5 illustrates a structural diagram of a video rendering device in accordance with one embodiment.

FIG. 5 illustrates a structural diagram of a video rendering device 500 in accordance with one embodiment. Comparing to the video rendering device 400, the video rendering device 500 further comprises a determining unit 404 and a releasing unit 405.

The determining unit 404 is configured to determine whether a video component has been created for a video node when the detecting unit 402 detects a trigger operation.

The releasing unit 405 is configured to release video component associated with other video nodes if the determining unit 404 determines that a video component has been created for a target video node.

In another embodiment, the determining unit 404 is configured to determine if a video component has been created for a video node according to the status flag of the video node. If it is determined that a video component has been created for the video node, the status flag of the video node may be reset as false.

Figure 6:
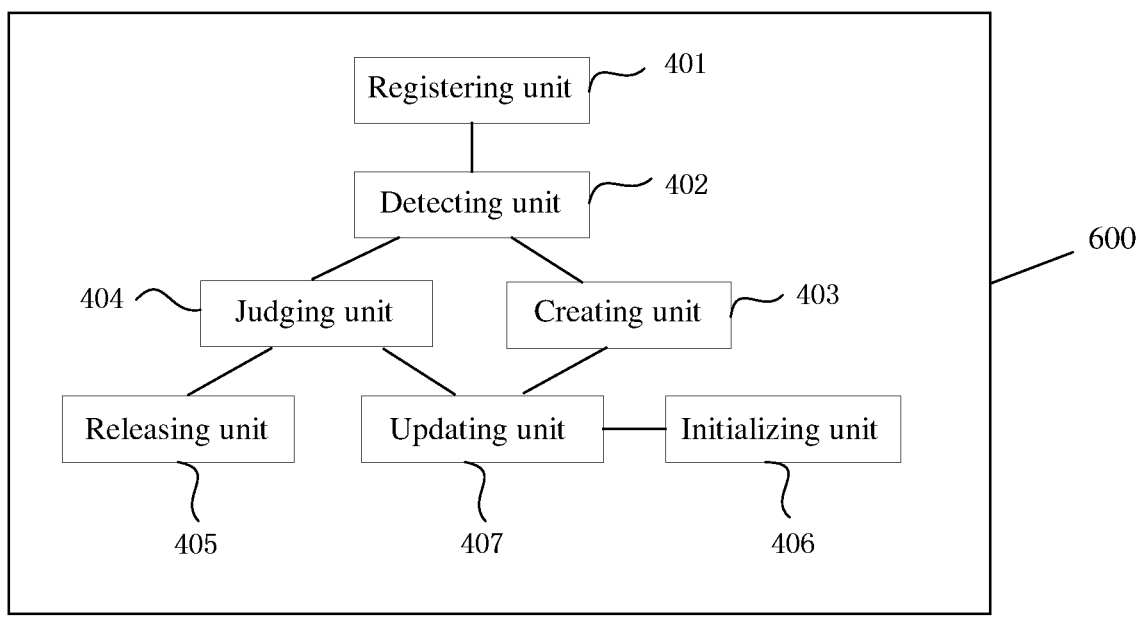
FIG. 6 illustrates a structural diagram of a video rendering device in accordance with one embodiment.

FIG. 6 illustrates a structural diagram of a video rendering device 600 in accordance with one embodiment. Comparing to FIG. 5, the video rendering device 600 further comprises an initiating unit 406 and an updating unit 407.

The initiating unit 406 is configured to initialize status flag for a video node and set the status flag as false when a video node is parsed to a webpage.

The updating unit 407 is configured to set the status flag of a target video node as true after the creating unit 403 creates a video component for a target video node.

The determining unit 404 is configured to determine if video component has been created for a video node according to the status flag. If the status flag is true, the video component has been created for the video node. The updating unit 407 may reset the status flag of the video node as false when it determines that a video component has not been created for the video node.

The updating unit 407 is further configured to reset the status flag of the video node as false when the determining unit 404 determines that a video component has been created for the video node.

Optionally, the releasing unit 405 is further configured to release a video component created for a video node on the webpage when the webpage is refreshed or closed.

The video rendering device implemented by various embodiments configured to parse video nodes on a webpage, register trigger operation, create video component for a target video node upon detection of a trigger operation, and use the video component to render the target video node. The video rendering device in this embodiment creates video components based upon user demand, enabling one video component on one webpage, thus preventing webpage from breaking down caused by using multiple video components, system resource waste, solving problem of lack of system memory, and improving user experience.

Those with common skills in the art can clearly know that the technologies of the embodiments of this invention can be implemented by software and hardware. Hardware includes integrated circuit, CPU, data storage, and element, etc. They can also be implemented by customized hardware, including customized integrated circuit, customized CPU, customized data storage, and customized element. Under many circumstances, however, using non-customized hardware may be better. Based on such understandings, technical solution of embodiments may be implemented by software. Such software may be stored in a storage medium, e.g. ROM (Read-Only Memory), RAM (Random Access Memory), magnetic disk, floppy disk, etc, including a couple of commands configured to enable one computer unit (a personal computer, a server or a network device) to execute the method described by various embodiments or some parts of the embodiments of this invention.

The various embodiments of the Specifications are described in a progressive manner. The identical and similar parts of various embodiments can be cross-referenced. The descriptions of each embodiment primarily focus on the differences between the embodiment and other embodiments. In particular, the system embodiment is described briefly as it is basically similar to the embodiments of the method. Please refer to descriptions of the embodiments of the method for relevant information.

The foregoing embodiments of this invention shall not restrict the scope of protection of this invention. All amendments, equivalent substitutions and improvements made as per the spirits and principles of this invention shall be within the scope of protection of this invention.

That which is claimed:

1. A video rendering method comprising:
   parsing a video node on a webpage and setting a status flag of the video node as false;
   registering a trigger operation for the video node, wherein performance of the trigger operation indicates a user operation to trigger the video node to play a video associated with the video node;
   detecting performance of the trigger operation associated with the video node;
   creating, in response to the detecting, a video component corresponding to the video node and using the corresponding video component to render the video node on the webpage upon detecting performance of the trigger operation associated with the video node;
   updating the status flag of the video node as true after the video component corresponding to the video node is created;
   and
   releasing video components associated with other video nodes in circumstances when the status flag of the video node is true indicating the video component is created for the video node.

2. The video rendering method of claim 1, wherein the method further comprises:
   parsing another video node on the webpage; and
   setting a corresponding status flag for the another video node as false upon parsing of the another video node on the webpage.

3. The video rendering method of claim 1, wherein the method further comprises:
   in an instance when a video component corresponding to the another video node has been created for the another video node on the webpage, update the status flag of the another video node as true.

4. The method of claim 1, wherein the method further comprises:
   releasing the created video component corresponding to the video node on the webpage upon refreshing or closing of the webpage.

5. The method of claim 3, wherein the method further comprises:
   releasing the created video component corresponding to the another video node on the webpage upon refreshing or closing of the webpage.

6. The method of claim 2, wherein the method further comprises:
   releasing the created video component corresponding to the video node on the webpage upon refreshing or closing of the webpage and in an instance when the status flag of the video node is true.

7. The method of claim 3, wherein the method further comprises:
   releasing the created video component corresponding to the another video node on the webpage upon refreshing or closing of the webpage and in an instance when the status flag of the another video node is true.

8. A video rendering device, the device comprising at least one processor and at least one non-transitory computer useable medium including computer program instruction code, the at least one non-transitory computer useable medium and the computer program instruction code configured to, with the at least one processor, cause the device to at least:
   parse a video node on a webpage and set a status flag of the video node as false;
   register a trigger operation for the video node, wherein performance of the trigger operation indicates a user operation to trigger the video node to play a video associated with the video node;
   detect performance of the trigger operation associated with the video node;
   create, in response to the detection, a video component corresponding to the video node and use the corresponding video component to render the video node on the webpage upon detecting performance of the trigger operation associated with the video node;
   update the status flag of the video node as true after the video component corresponding to the video node is created;
   and
   release video components associated with other video nodes in circumstances when the status flag of the video node is true indicating the video component is created for the video node.

9. The device of claim 8, wherein the at least one non-transitory computer useable medium and the computer program instruction code are further configured to, with the at least one processor, cause the device to at least:
parse another video node on the webpage; and
set a corresponding status flag for the another video as false upon parsing of the another video node on the webpage.

10. The device of claim 9, wherein the at least one non-transitory computer useable medium and the computer program instruction code are further configured to, with the at least one processor, cause the device to at least;
in an instance when a video component corresponding to the another video node has been created for the another video node on the webpage, update the status flag of the another video node as true.

11. The device of claim 8, wherein the at least one non-transitory computer useable medium and the computer program instruction code are further configured to, with the at least one processor, cause the device to at least: release the created video component corresponding to the video node on the webpage upon refreshing or closing of the webpage.

12. The device of claim 9, wherein the at least one non-transitory computer useable medium and the computer program instruction code are further configured to, with the at least one processor, cause the device to at least: release the created video component corresponding to the another video node on the webpage upon refreshing or closing of the webpage.

13. The device of claim 10, wherein the at least one non-transitory computer useable medium and the computer program instruction code are further configured to, with the at least one processor, cause the device to at least: release the created video component corresponding to the video node on the webpage upon refreshing or closing of the webpage and in an instance when the status flag of the video node is true.

14. A non-transitory computer program product comprising a computer useable medium having computer program instruction code stored thereon that, when executed by at least one processor, cause the at least one processor to perform operations for video rendering, comprising:
parsing a video node on a webpage and setting a status flag of the video node as false;
registering a trigger operation for the video node, wherein performance of the trigger operation indicates a user operation to trigger the video node to play a video associated with the video node;
detecting performance of the trigger operation associated with the video node;
creating, in response to the detecting, a video component corresponding to the video node and using the corresponding video component to render the video node on the webpage upon detecting performance of the trigger operation associated with the video node;
updating the status flag of the video node as true after the video component corresponding to the video node is created;
and
releasing video components associated with other video nodes in circumstances when the status flag of the video node is true indicating the video component is created for the video node.

15. The video rendering method of claim 1, wherein the video component comprises a SurfaceView or VideoView used for video rendering on the webpage.

16. The video rendering method of claim 1, wherein the method further comprises:
generating a video management file to manage video node information on the webpage, wherein the video management file comprises all video nodes on the webpage and a status flag for each respective video node initialized to false.

* * * * *